United States Patent [19]

Thorton-Trump

[11] Patent Number: 5,746,396
[45] Date of Patent: May 5, 1998

[54] DEICER

[75] Inventor: Walter E. Thorton-Trump, Providencialles, Turks/Caicos Islands

[73] Assignee: Baltab Holdings, Ltd., Turks/Caicos Islands

[21] Appl. No.: 327,201

[22] Filed: Oct. 21, 1994

[51] Int. Cl.$^6$ .................................................. B64D 15/10
[52] U.S. Cl. .................... 244/134 R; 239/172; 169/24; 182/2
[58] Field of Search .......................... 244/134 R, 134 D; 239/172, 261, 168, 169, 165; 169/24; 212/341; 74/521; 182/148, 2

[56] References Cited

U.S. PATENT DOCUMENTS 3,169,581   2/1965   Cummins ................................... 69/24

*Primary Examiner*—Galen L. Barefoot
*Attorney, Agent, or Firm*—Veal & Associates

[57] ABSTRACT

A mobile deicer is mounted on hydrostatically driven wheels mounted directly to the longitudinal frame without springs, thereby increasing the stability of the apparatus. Supported on the frame is the unique body which allows stand up access to the engine compartment, carries a larger volume of deicing fluid, provides a crew compartment shielded from the weather, and provides ready access to the operator compartment. Supported atop the body and aligned with the longitudinal of the frame is the main boom, which raises and lowers the operators compartment. The operators compartment is connected to the main boom by a parallelogram boom which maintains the platform supporting the operators compartment in the horizontal plane. Also mounted on the platform is a scissor boom extendible horizontally which carries a nozzle on its distal end, the nozzle being positionable under the operators control. The scissor boom may be inclined relative to the horizontal plane within preset limits.

14 Claims, 6 Drawing Sheets

DEICER

FIELD OF THE INVENTION

The present invention relates to the field of aircraft maintenance and safety and more particularly to the on ground servicing of aircraft surfaces to remove ice and snow therefrom and to prevent the formation of ice and snow thereon. In greater particularity, the present invention relates to an aircraft deicing apparatus that allows the crew to comfortably and conveniently service an aircraft. In further particularity, the present invention relates to a deicing machine which accommodates the crew thereof with a workspace sheltered from the outdoor environment, and a means for delivering deicing fluids proximal the aircraft surfaces.

BACKGROUND OF THE INVENTION

Aircraft icing during inclement weather is the most severe hazard facing air traffic while on the ground. Virtually every airport of any size located above the temperate zones has a fleet of deicing machines or is unable to remain open when snow and or sub-freezing temperatures make icing conditions ripe on the aircraft lift surfaces. Icing reduces the lift available from such surfaces and increases the weight of the aircraft thus making the icing condition one of the most hazardous of all aviation.

Icing is countered on the ground by the use of cherry picker type deicing machines which have heretofore been built on truck chassis supplied by manufacturers such as Ford Motor Company and the like. These trucks generally have a wheel base of about 16 feet and can carry about 2000 gallons of deicing fluid. In most deicer machines, the operator rides in a bucket at the end of a maneuverable boom and directs a spray of deicing fluid from an associated nozzle toward the aircraft surface.

U.S. Pat, No. 4,565,321 shows a VEHICLE FOR DEICING AIRCRAFT which comprises an undercarriage having a lifting device carrying a closed operation cabin. The vehicle includes a spray device for applying spray fluid to the aircraft, and this spray device comprises a pump and a connected spray nozzle. The spray nozzle is supported on a longitudinally adjustable lightweight boom carried by the cabin. The cabin is further pivotally supported by a turntable construction relative to the carriage. The nozzle is also connected to remote control devices in the cabin for pivotal movement of the nozzle about two axes extending perpendicular to each other. The two pivot axes are appropriately intersecting in a point coinciding with the direction of the jet from the nozzle.

The '321 device is, as with it's predecessor art, built on a truck body having a forward truck type cab and a 17 foot wheel base, and a 2100 gallon fluid capacity. The "cabin" is inaccessible in its stowed position, and the "lightweight boom" is a telescopic boom. While the device is an improvement, it leaves much to be desired in terms of efficiency of operation, operator comfort and performance capabilities. By way of example, in the event of a snow storm, or other conditions at an airport which might be conducive to icing, the deicing of the aircraft at the gate area may be insufficient. That is to say, the distance between the gate area and the end of the runway may be measured in miles and the aircraft may be lined up to gain access to the runway, thus considerable opportunity for icing is presented between the gate and the throat of the runway. Accordingly it would be desirable to provide a deicing apparatus proximal the end of the runway which would be able to service the aircraft on an as needed basis. A severe problem with the prior art devices which required the operator to stand in an open bucket to service the aircraft is his exposure to the foul weather. The '321 device has alleviated some of this problem by providing a cabin but leaves much to be desired. Specifically the operator must enter the cabin from the exterior and cannot regain the cab of the truck except by exposing himself to the weather again. Further the boom mechanism is somewhat limited and the "truck" design makes it difficult to service the apparatus, particularly if such serving is required at the end of the runway.

SUMMARY OF THE INVENTION

It is the object of the present invention to improve the capability of the service crew to deice aircraft awaiting takeoff.

As an adjunct to that object, it is an object of this invention to provide a deicing apparatus which can stay "on station" performing its deicing function for a longer period of time with minimal fatigue to the operators and minimal exposure of the operators to adverse weather conditions.

As a further adjunct to the principal object, the present invention provides a greater capacity of fluid to the operator and provides a delivery means which enhances the delivery of the fluid to the aircraft surface.

Yet another object of the invention is to provide a deicer apparatus which is compact and maneuverable and which can be readily transported from one location to another.

Still a further object of the invention is to provide a deicer apparatus which is relatively easy to maintain and to service.

To accomplish these and other objects the present invention has been designed from the ground up for its specific function. That is to say, from the wheels supporting the apparatus to the boom positioning the spray nozzle, the present invention represents a unique combination of elements designed to enhance the deicing function. The wheels of the deicer are hydrostatically driven and provide four wheel steering unlike any other deicer. They are mounted directly to the longitudinal frame without springs, thereby increasing the stability of the apparatus. Supported on the frame is the unique body which allows stand up access to the engine compartment, carries a larger volume of deicing fluid, provides a crew compartment shielded from the weather, and provides ready access to the operator compartments. Supported atop the body and aligned with the longitudinal of the frame is the main boom, which raises and lowers the operators compartment. The operators compartment is connected to the main boom by a parallelogram boom which maintains the platform supporting the operators compartment in the horizontal plane. Also mounted on the platform is a scissor boom extendible horizontally which carries a nozzle on its distal end, the nozzle being positionable under the operators control. The scissor boom may be inclined relative to the horizontal plane within preset limits.

The design of this invention allows the operator to put the deicing fluid where the snow or ice and snow is without putting the operator in adverse conditions. The crew would make its way to the apparatus and enter the crew compartment, turn on the light, close the door and hang up their heavy clothing. They would then enter their respective compartments, start the engine and maneuver the vehicle to a position near where the aircraft would potentially need deicing. The operator would elevate his compartment to height and the driver would put the deicer in proper position. The operator would then extend the nozzle or rotate the nozzle or platform on which his compartment and the nozzle are mounted to position the nozzle within five to six feet from the wing. By manipulating the nozzle, boom and platform he can quickly remove ice and snow or snow from the airplane surfaces.

BRIEF DESCRIPTION OF THE DRAWINGS

Apparatus embodying features of my invention are depicted in the accompanying drawings which form a portion of this disclosure and wherein.

DESCRIPTION OF THE PREFERRED EMBODIMENT

Figure 1:
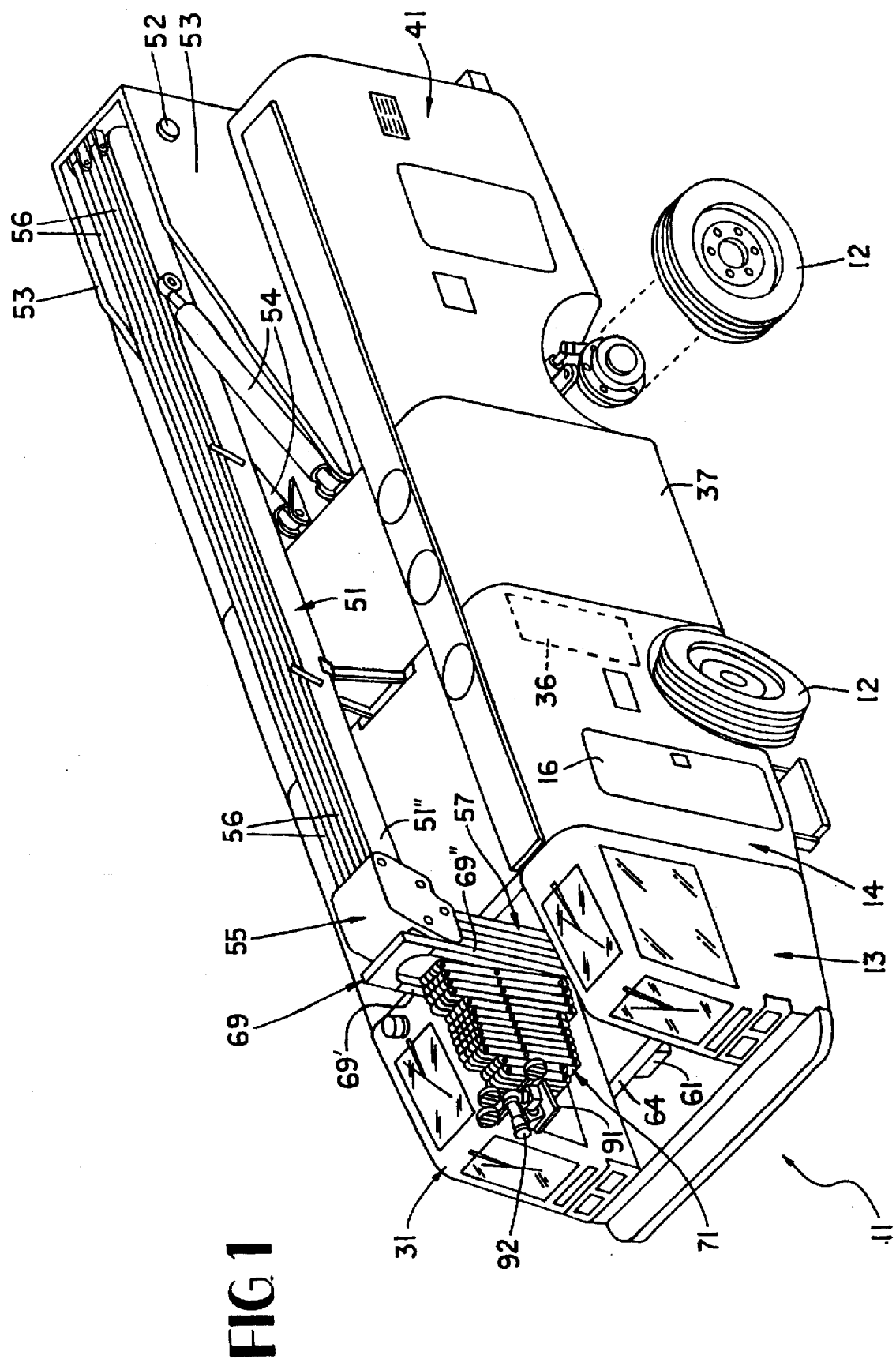
FIG. 1 is a perspective view of the deicer.
Figure 2:
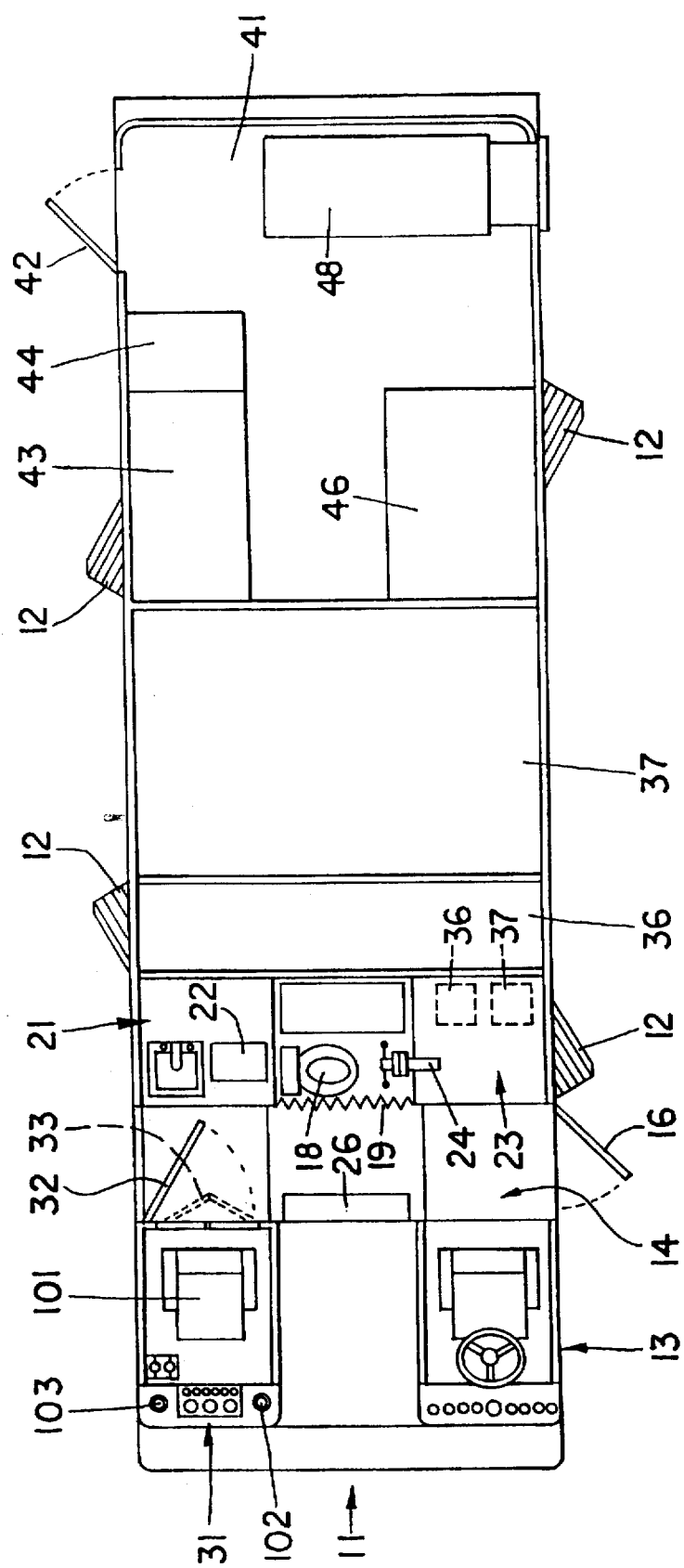
FIG. 2 is a plan view of the vehicle portion of the deicer.
Figure 3:
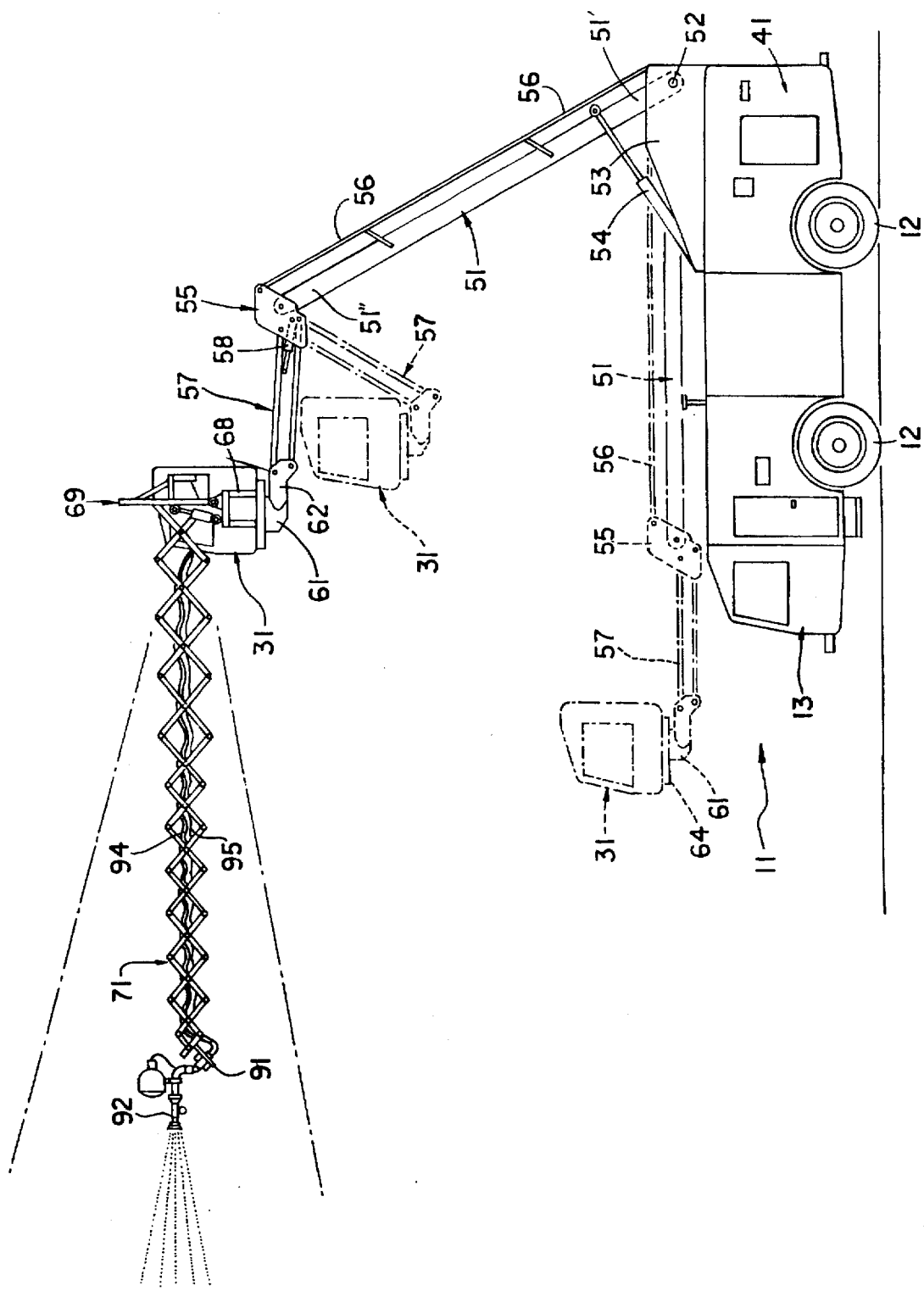
FIG. 3 is a side elevational view of the deicer.
Figure 4:
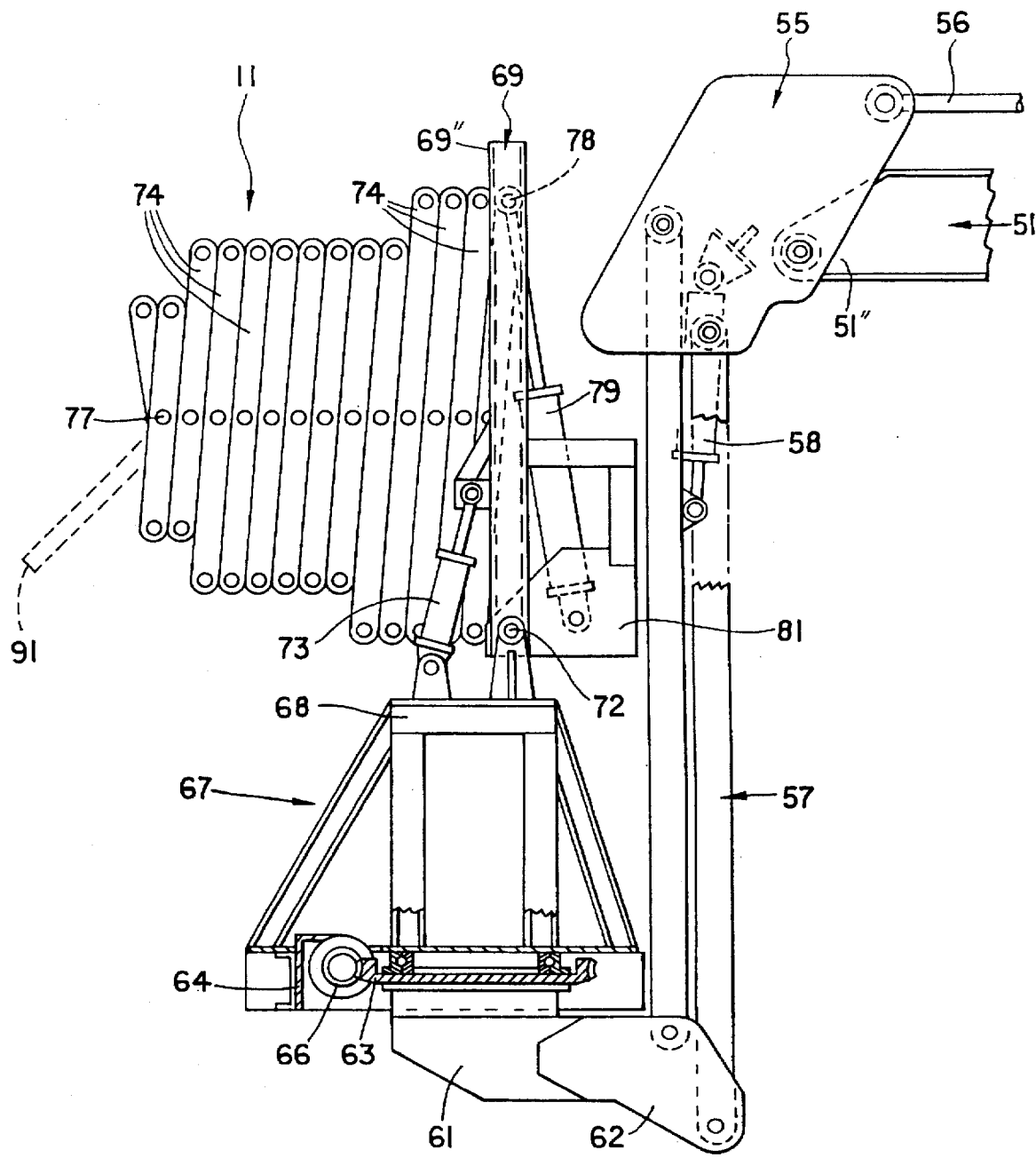
FIG. 4 is a side elevational view of the extendible boom assembly.
Figure 5:
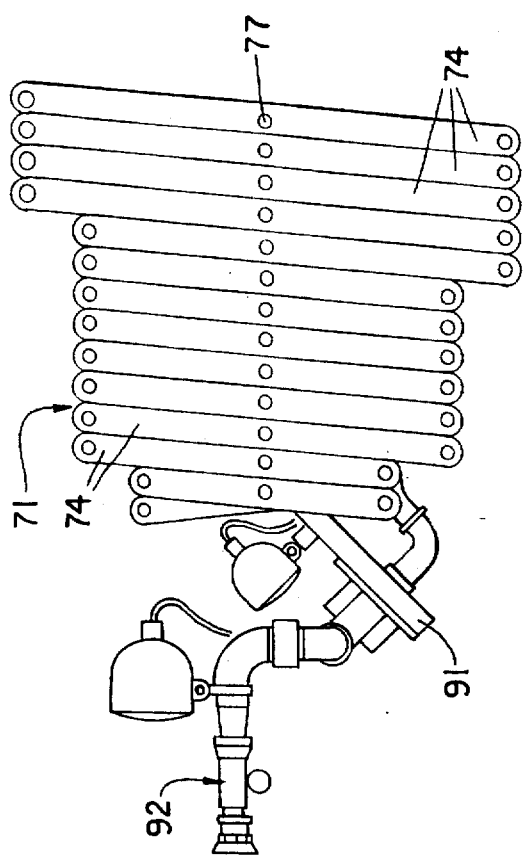
FIG. 5 is a side elevational view of the spray nozzle mounted on the extendible boom.
Figure 8:
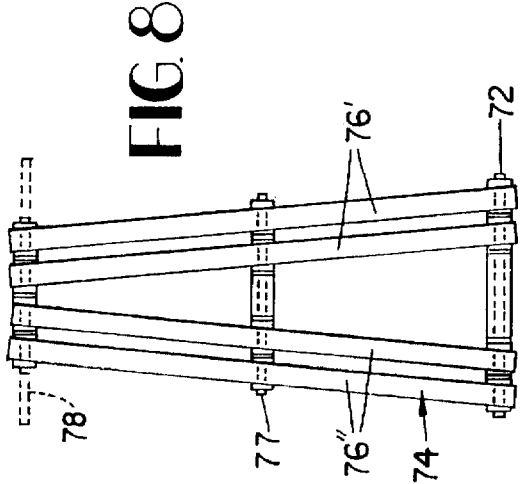
FIGS. 6–8 are front elevational views of individual links of the extendible boom.
Figure 7:
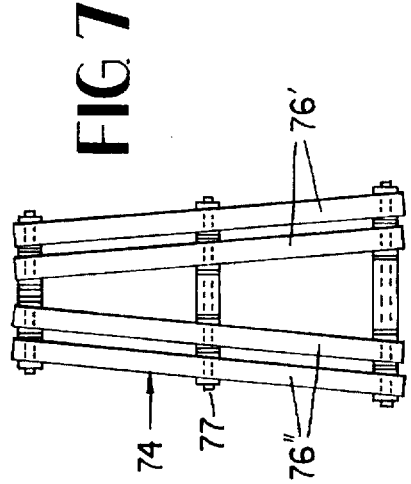
Figure 6:
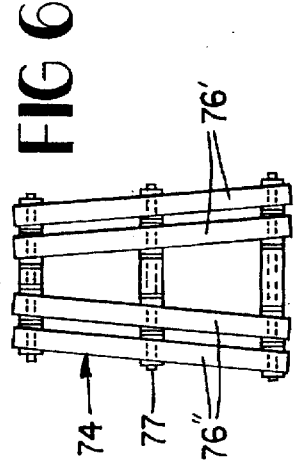
Figure 9:
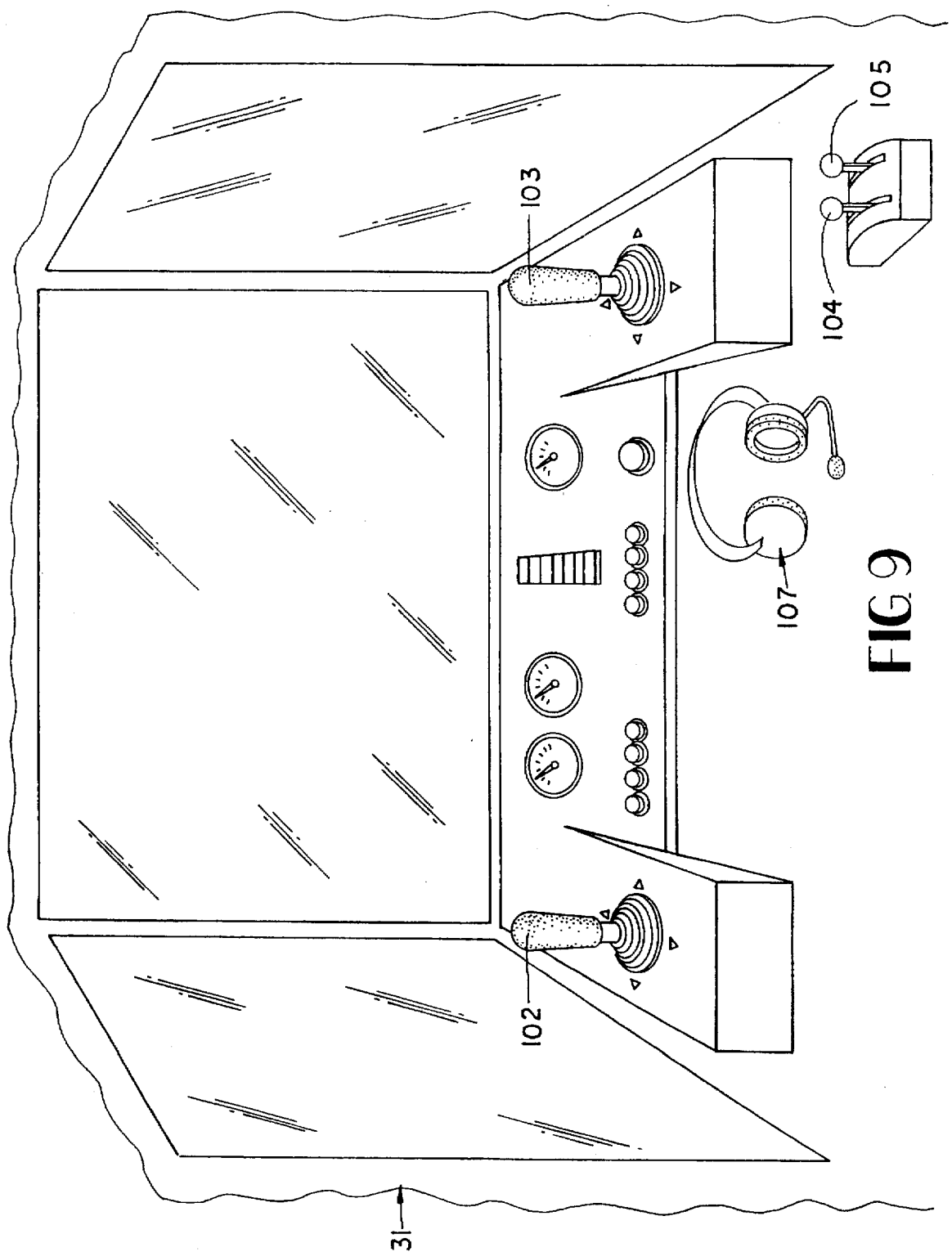
FIG. 9 is a perspective view of the interior of the operator's compartment.

Referring to the drawings for a clearer understanding of the present invention, it may be seen in FIG. 1 that my deicer is an elongated vehicle 11 supported on four hydrostatically driven wheels 12 which provide four wheel drive and steering. Referring specifically to FIGS. 1–3, it may be seen that the vehicle is provided with a forward drivers compartment 13 which is accessible from and internal crew compartment 14. Crew compartment 14 is accessible from the exterior of the vehicle 11 via door 16. The compartment 14 is provided with lights (not shown), a rack 17 for hanging garments, a chemical toilet 18 and privacy curtain 19, a galley area 21 including a microwave oven 22 and storage area, a work space 23 including a vise 24, and a main electrical junction box 26. The compartment is sufficiently roomy to allow the crew to move about to prepare food or beverage in the galley, utilize the toilet or workspace or gain access to the drivers compartment and an operators compartment 31. Access to the operators compartment is through a hinged door 32 opening into the crew compartment 14 and a folding door 33 carried by the operator compartment 31. Workspace 23 is formed by a housing which fits over one of the pumps used to move fluids in the deicer.

The wheel base of the vehicle 11 is 11 feet and in between wheels 12 the vehicle 11 supports two deicer fluid tanks, 36 and 37. Tank 36 sits immediately behind the crew compartment 14 and has a capacity of 500 gallons of deicing fluid. Tank 37 sits immediately behind tank 36 and has a capacity of 2500 gallons of water or deicing fluid. Each tank 36 and 37 has a separate pump 36a or 37a for pumping fluid therefrom, the pumps being accessible from the crew compartment 14.

Rearward of the tanks 36 and 37 is the engine compartment 41 which is accessible through door 42 and is a walk-in and stand up compartment provided with lighting (not shown). The engine compartment 41 houses a six cylinder 5.9 liter Cummings® diesel engine 43 which drives seven hydraulic pumps 44. Also located in the engine compartment 41 is a 150 gallon hydraulic fluid tank 46, having oversized in-line filters 47 in the return lines and very large intake lines to the pumps 44. All of the pumps 44 are driven with SAE spline shafts (not shown); thus the only belt in the unit is the cog belt on the engine fan. It will be understood by those skilled in the art that the pumps will drive the hydrostatic wheels 12 in a manner well known in the art and will be connected to the wheels such that no pump drives two wheels which are located on the same side or longitudinal location.

In addition, the engine compartment 41 houses a three million BTU/hr heater 48 operatively connected to heat the deicing fluid as taught in U.S. Pat. No. 4,032,090 which is incorporated herein by reference. The engine compartment is provided with appropriate ventilation openings to accommodate the air flow needed by the heater and engine. Also mounted in the area of the engine compartment and accessible through a second door is a ground hose reel which may be used to spray surfaces from the ground.

At the rear of the vehicle 11, a ladder provides access to the top of the vehicle for servicing as needed. However, the ladder is not needed during the deicing function, contrary to the apparatus shown in the '321 patent wherein the operator must clamber up onto the apparatus to enter the superjacently mounted cabin. The vehicle supports a main boom 51 mounted along the top thereof and aligned with the longitudinal axis of the vehicle 11 for pivotal motion about a horizontal axis only. The horizontal axis is defined by a pin 52 secured in a mounting bracket 53 atop the vehicle 11 and extending transversely of one end 51' of the main boom 51. A pair of hydraulic actuators 54, which receive fluid from pumps 44 are used to raise and lower main boom 51. A positioning bracket 55 is mounted to the distal end 51" of the main boom 51. A positioning rod 56 is connected between brackets 53 and 56 to form a parallelogram with main boom 51 such that the attitude of bracket 53 is maintained as the boom is raised and lowered. Pivotally connected to positioning bracket 53 is a second parallelogram boom 57 aligned in the same vertical plane as main boom 51. A hydraulic cylinder 58 urges the parallelogram boom from a vertical stored position to a position inclined from the bracket 53 slightly above horizontal. The distal end 57' of the boom 57 supports a platform 61 which is maintained in alignment with the horizontal as the boom 57 moves between positions.

The platform 61 includes a positioning bracket 62 mounted to the end 57' of boom 57 to complete the parallelogram. The bracket 62 has formed on its central portion a fixed ring gear 63 and appropriate bearings to support an upper platform section 64. Upper platform section 64 carries a worm and motor combination 66 which engage the gear 63. Supported on the upper platform section is the operator compartment 33. It should be noted that the operator compartment 33 is supported in offset relation to the boom 57 and main boom 51 such that when both booms are in their lowermost retracted positions compartment 33 is nested into cooperative relationship such that folding door 34 is adjacent crew compartment door 32. When both booms are fully extended operation of the worm and motor 66 causes the upper platform section 64 to rotate about a vertical axis passing through the gear 63 and in the plane of the extended booms.

Mounted to the upper platform section is a superstructure 67 for an extendible boom 71. Included within the superstructure is a stool 68 and frame 69 supported on the stool 68. The frame 69 is mounted to the stool on a horizontally disposed pivot pin 72 and is further connected to the stool 68 by a pair of linear actuators 73 which may be used to vary the inclination the frame 69. The extendible boom 71 is a horizontally disposed scissor mechanism comprising a plurality of link pairs 74, each link pair including a right and left link member 76' and 76". The first of these link pairs 74 is pivotally mounted at a lower end thereof to frame 71 by pivot pin 75. A second pair of link members 76' and 76" are connected to the first pair at a scissor pin 77 located approximately at the middle of each link member and extending transversely of the link members. As is best illustrated in FIGS. 6–9 the link members 76' and 76" are inclined toward each other from bottom to top. The top of the second link pair is connected via an upper link pin 78 and a centrally disposed sleeve thereon is connected to a linear actuator 79 which is connected at its other end to a frame extension 81. The upper link pin 78 extends transversely and is slidably engaged with opposing inwardly facing channels 69' and 69" in frame 69 such that link pin 78 is constrained to move within the plane of the frame. As illustrated in the drawings the ends of each link member 76 are connected to link pins and each link pair is connected to a cooperative link pair by a scissor pin to form a plurality of scissor links which together form the extendible boom 71. Note that the links are diminished in size at the outer end of the boom, and intermediately sized links are used in the medial portion of the boom 71.

Boom 71 terminates in a spray nozzle platform 91 fixed at a selected angle relative to the boom's longitudinal axis, and supporting a positionable spray head 92 thereon. The spray head 92 may be moved about a vertical and a horizontal axis and is commercially available. The output plume of spray may be varied from a stream to a fan plume. Independent conduits 94 and 95 supply fluid from the tanks 36 and 37 via the associated pumps.

Inside the operators compartment 33 is a seat 101, a joystick 102 which controls the extension of the boom 71 and the rotation of platform section 64. A second joystick 103 controls the orientation of the nozzle, and a pair control levers 104 and 106 control main boom 51 and parallelogram boom 57. The operator is further provided with a personal heater and a voice communication system 107 for communication with the drivers cab. The controls for the hydraulic components are electrical from the operators compartment to an emergency override panel located on the side of the vehicle at which point the booms and worm motor can be manually hydraullicly controlled if necessary.

While I have shown my invention in one form, it will be obvious to those skilled in the art that it is not so limited but is susceptible of various changes and modifications without departing from the spirit thereof.

What I claim is:

1. Apparatus for deicing aircraft comprising, in combination:

(a) a ground vehicle having means for propulsion over the surface of the ground and a longitudinal axis wherein said vehicle has an enclosed internal crew compartment, a enclosed drivers compartment accessible from said crew compartment, and a closable door between the crew compartment and the exterior of said vehicle, said crew compartment and said drivers compartment being protected from external ambient weather conditions;

(b) a main boom mounted to said ground vehicle and aligned with said longitudinal axis, said main boom being mounted for selective movement about a horizontal pivotal mount at one end thereof atop said vehicle;

(c) a parallelogram boom mounted to said main boom at an end thereof opposite said pivotal mounting, said parallelogram boom being selectively positionable between a vertical position and a position displaced over 90° from the vertical position;

(d) a platform supported on said parallelogram boom distal said main boom such that said platform remains horizontally disposed at all positions of said parallelogram boom;

(e) means for rotating said platform through 360° about a vertical axis;

(f) an enclosed operator's compartment mounted on said platform for an operator to occupy, said compartment having an access opening cooperatively formed to define an entry way providing ingress and egress between the internal crew compartment of said vehicle and said operator's compartment without exposure to ambient weather externally of said vehicle when said operator's compartment is positioned adjacent an entry way opening into said crew compartment and said operator's compartment and means for closing said entry way when said operator's compartment is displaced from said vehicle by said boom;

(g) an extendible boom mounted on said platform and extendible generally horizontally therefrom;

(h) a positionable nozzle mounted on said extendible boom for directing a spray of deicing fluid therefrom under the control of an operator in said operator's compartment; and, (i) means for providing a supply of deicing fluid from within said vehicle to said nozzle.

2. Apparatus as defined in claim 1, wherein said extendible boom comprises:

(a) a frame mounted on said platform and extending substantially vertically therefrom;

(b) a plurality of link pairs including a first link pair each link pair including a left and right link member, said first link pair pivotally mounted to said frame at a lower end of each link member thereof for concomitant pivotal motion about a common transverse axis, a second link pair pivotally mounted to said first link pair, intermediate the ends of each link member at a scissor axis extending transversely through said first and second link pairs, and connected to a cross member at an upper end of the left and right members thereof, the remainder of said plurality of link pairs pivotally mounted to said first and second link pairs to form a series of pivotally connected scissor links; and (d) a linear actuator having a first end connected to said frame and a second end connected to said cross member of said second pair such that the upper ends of said second pair move relative to the lower ends of said first link pair responsive to variation in length of said linear actuator causing said scissor links to extend and retract accordingly.

3. Apparatus as defined in claim 2, wherein said right and left members of each of said link pairs are inclined toward each other having the greatest separation at their respective bottom ends.

4. Apparatus as defined in claim 2, wherein said frame is mounted to said platform for limited pivotal movement about a horizontal axis and means for positioning said frame relative to said horizontal axis are connected to said frame such that said frame and scissor members affixed thereto may be positioned relative to said horizontal axis.

5. Apparatus as defined in claim 1, wherein said operators compartment contains therewithin control means for selectively extending said extendible boom, control means for selectively operating said nozzle, control means for raising and lowering said parallelogram boom, control means for raising and lowering said main boom, and means for communicating with said vehicle.

6. Apparatus as defined in claim 1, wherein said means for propulsion includes four wheel dual hydrostatic drives and four wheel steering.

7. Apparatus as defined in claim 1, wherein said means for providing comprises:

(a) a first storage tank located within said vehicle containing a quantity of a first deicing fluid;

(b) conduit means extending from said first storage tank to said nozzle for providing fluid communication therebetween, including a length of flexible conduit supported by said extendible boom; and (c) pump means located within said vehicle for urging said first deicing fluid from said tank, through said conduit means to said nozzle.

8. Apparatus as defined in claim 7 further comprising:

(a) a second tank containing a second quantity of a second deicing fluid;

(b) second conduit means extending from said second storage tank to said nozzle for providing fluid communication therebetween, including a length of flexible conduit supported by said extendible boom;

(c) second pump means for urging said second deicing fluid from said second tank, through said second conduit means to said nozzle; and, (d) means for selectively permitting fluid flow through said first conduit means or said second conduit means to said nozzle.

9. Apparatus as defined in claim 1, wherein said vehicle includes an engine compartment housing an engine, a heater for heating said deicing fluid, and pumps driven by said engine supplying hydraulic fluid to said propulsion means, said compartment having an access door and a floor and ceiling spaced vertically from each other sufficiently to permit upright movement by an individual within said compartment.

10. Apparatus as defined in claim 1, wherein said vehicle comprises a pair of spaced apart longitudinal I-beams forming a vehicle frame, each of said I-beams defining a longitudinal channel, an electrical wiring system providing control and power to electrical components of said apparatus, said electrical wiring system partially extending longitudinally of said vehicle within conduit members positioned in said longitudinal channel.

11. Apparatus for delivering a fluid to a surface of a free standing object comprising:

(a) a platform supported by an articulated boom on a vehicle having means for propulsion over the surface of the ground and selectively positionable proximal said object and said vehicle wherein said vehicle has an enclosed internal crew compartment, an enclosed drivers compartment accessible from said crew compartment, a closable entry way between said crew compartment and said platform, and a closable door between the crew compartment and the exterior of said vehicle, said platform having an enclosed operator's compartment mounted thereon with a doorway permitting ingress and egress to said crew compartment when said platform is proximal said entryway;

(b) an extendible boom mounted on said platform for selective extension and retraction between a maximum extended position and a stored retracted position such that the length of the boom in its extended position is grater than 2.5 times its length in the retracted position;

(c) a positionable nozzle mounted on said extendible boom distal said platform; and, (d) means for supplying fluid from a remote source to said nozzle.

12. Apparatus as defined in claim 11, wherein said extendible boom comprises:

(a) a frame mounted on said platform and extending substantially vertically therefrom;

(b) a plurality of link pairs including a first link pair each link pair including a left and right link member, said first link pair pivotally mounted to said frame at a lower end of each link member thereof for concomitant pivotal motion about a common transverse axis, a second link pair pivotally mounted to said first link pair, intermediate the ends of each link member at a scissor axis extending transversely through said first and second link pairs, and connected to a cross member at an upper end of the left and right members thereof, the remainder of said plurality of link pairs pivotally mounted to said first and second link pairs to form a series of pivotally connected scissor links; and, (d) a linear actuator having a first end connected to said frame and a second end connected to said cross member of said second pair such that the upper ends of said second pair move relative to the lower ends of said first link pair responsive to variation in length of said linear actuator causing said scissor links to extend and retract accordingly.

13. Apparatus as defined in claim 12, wherein said right and left members of each of said link pairs are inclined toward each other having the greatest separation at their respective bottom ends.

14. Apparatus as defined in claim 12, wherein said frame is mounted to said platform for limited pivotal movement about a horizontal axis and further comprising means for positioning said frame relative to said horizontal axis are connected to said frame such that said frame and scissor members affixed thereto may be positioned relative to said horizontal axis.

* * * * *